United States Patent
Gerum

(10) Patent No.: US 8,037,866 B2
(45) Date of Patent: Oct. 18, 2011

(54) METHOD AND DEVICE FOR CONTROLLING A SUCTION PRESSURE OF AN INTERNAL COMBUSTION ENGINE

(75) Inventor: Eduard Gerum, Rosenheim (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/729,783

(22) Filed: Mar. 23, 2010

(65) Prior Publication Data

US 2010/0228464 A1    Sep. 9, 2010

Related U.S. Application Data

(63) Continuation of application No. PCT/EP2008/007764, filed on Sep. 17, 2008.

(30) Foreign Application Priority Data

Sep. 24, 2007    (DE) .................. 10 2007 045 622

(51) Int. Cl.
*F02D 1/00* (2006.01)
(52) U.S. Cl. ......... 123/399; 123/361; 123/383; 123/403
(58) Field of Classification Search .................. 123/337, 123/361, 376, 377, 382, 383, 393, 399, 403; 60/605.1
See application file for complete search history.

(56) References Cited

U.S. PATENT DOCUMENTS

| | | | |
|---|---|---|---|
| 7,174,777 B2 * | 2/2007 | Fischer et al. ............. | 73/114.33 |
| 7,281,531 B1 * | 10/2007 | Fulton et al. ............. | 123/568.17 |
| 7,461,508 B2 * | 12/2008 | Rosin et al. ............. | 60/612 |
| 7,540,148 B2 * | 6/2009 | Wild et al. ............. | 60/602 |
| 2006/0168958 A1 * | 8/2006 | Vetrovec ............. | 60/599 |
| 2008/0066467 A1 * | 3/2008 | Nemeth et al. ............. | 60/606 |
| 2008/0072595 A1 * | 3/2008 | Nemeth et al. ............. | 60/605.1 |

FOREIGN PATENT DOCUMENTS

| | | |
|---|---|---|
| DE | 10 2005 056 074 A1 | 7/2006 |
| DE | 10 2005 010 792 A1 | 9/2006 |
| DE | 10 2006 008 783 A1 | 9/2006 |
| DE | 10 2006 008 785 A1 | 3/2007 |
| WO | WO 2005/064134 A1 | 7/2005 |
| WO | WO 2006/089779 A1 | 8/2006 |

OTHER PUBLICATIONS

German Office Action dated May 15, 2008 including English translation (Eight (8) pages).
International Search Report dated Feb. 16, 2009 including English translation (Six (6) pages).

* cited by examiner

*Primary Examiner* — John Kwon
(74) *Attorney, Agent, or Firm* — Crowell & Moring LLP

(57) ABSTRACT

A method device for controlling a suction pressure of an internal combustion engine, particularly a diesel engine having an exhaust gas turbocharger. The compressor is connected to a suction line of the internal combustion engine via an actuating section having an actuating element for changing a cross-section of the actuating section. In the first step, the current suction pressure in the suction line of the internal combustion engine is determined. A compressor pressure of the compressor is determined by pressure sensors and compared to the suction pressure. Values corresponding to current operating data of the internal combustion engine are identified and an actuation signal is generated using a controller, based on the comparison; and changing the cross-section of the actuating section is adjusted by adjusting the actuating element using the actuating signals.

9 Claims, 2 Drawing Sheets

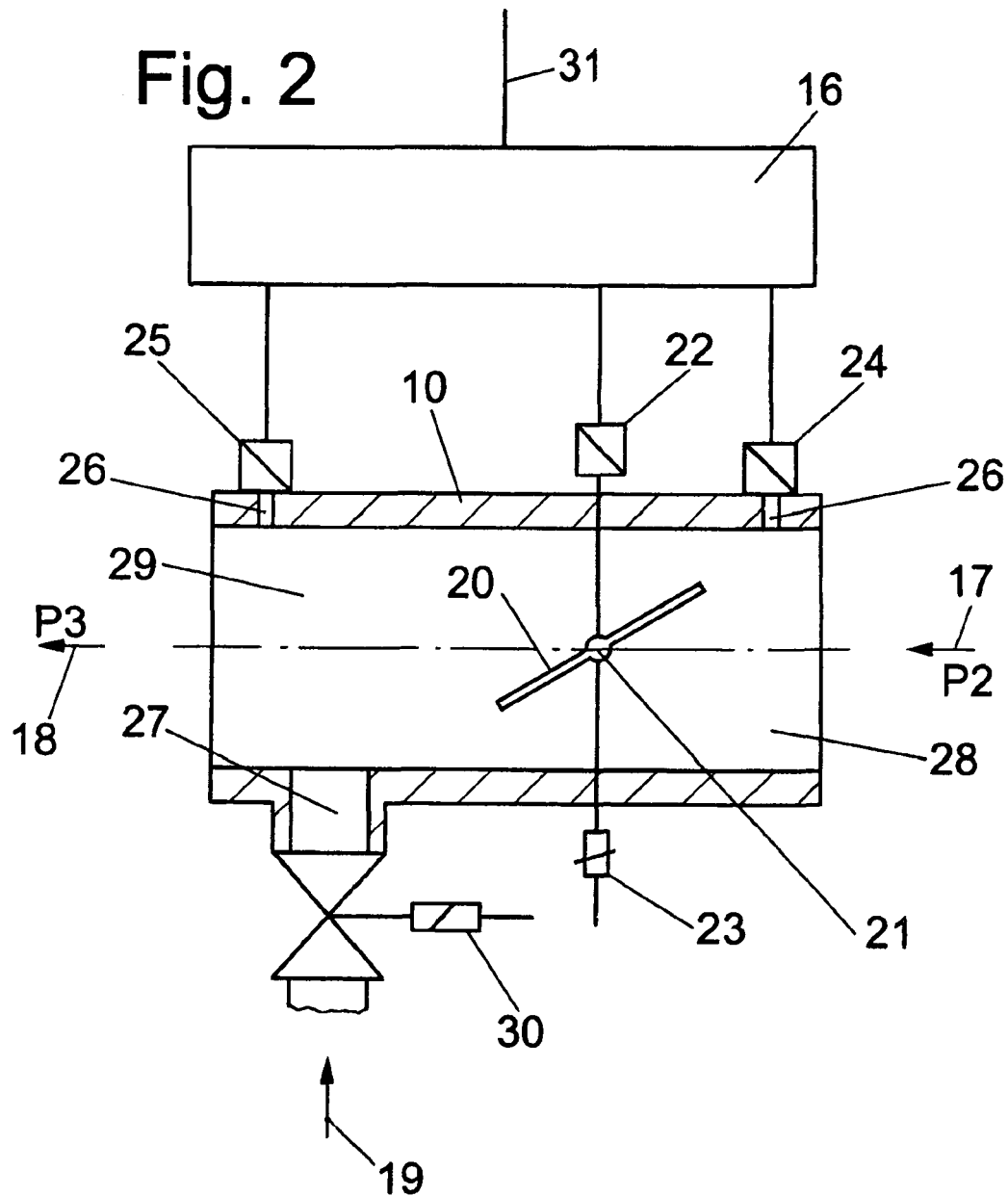

METHOD AND DEVICE FOR CONTROLLING A SUCTION PRESSURE OF AN INTERNAL COMBUSTION ENGINE

CROSS-REFERENCE TO RELATED APPLICATIONS

This application is a continuation of PCT International Application No. PCT/EP2008/007764, filed Sep. 17, 2008, which claims priority under 35 U.S.C. §119 from German Patent Application No. DE 10 2007 045 622.2, filed Sep. 24, 2007, the entire disclosures of which are herein expressly incorporated by reference.

BACKGROUND AND SUMMARY OF THE INVENTION

The invention relates to a method and a device for regulating an intake pressure of an internal combustion engine, in particular diesel engine, having an exhaust gas turbocharger.

Internal combustion engines, such as for example diesel engines, are frequently equipped with exhaust gas turbochargers. They have a turbine which is driven by the exhaust gas and which is coupled to a compressor. The compressor compresses the intake air in order to increase an intake pressure in an intake line for the internal combustion engine, as a result of which, for example, an acceleration behaviour of the vehicle with the internal combustion engine is achieved and the consumption of energy is reduced.

However, the exhaust gas turbocharger cannot deliver sufficient air in every operating state of the internal combustion engine and therefore generate a sufficient intake pressure. In order to solve this problem, exhaust gas turbochargers with variable geometry have been proposed, in which, for example, guide vanes for turbines/compressors can be adjusted as a function of the respective operating state or operating data/parameters of the internal combustion engine. However, it is disadvantageous here that an exhaust gas turbocharger with variable geometry is costly and complex in terms of parts. Furthermore, it can be very maintenance-intensive, which increases the operating costs of a vehicle. In addition, it is also not always possible for an exhaust gas turbocharger with variable geometry to deliver the quantity of air required by the internal combustion engine. In particular in what is referred to as a non-steady-state range, such as for example acceleration, problems occur. If the exhaust gas turbocharger is optimized for such a non-steady-state range, it has a poor efficiency and an associated high level of fuel consumption in the steady-state range, for example when travelling at a constant velocity or with a constant engine speed.

Furthermore, piston engines such as diesel engines with an exhaust gas turbocharger have, for example, an operating state when accelerating which is referred to as "turbo lag". Here, when the throttle is opened the internal combustion engine does not react by increasing the rotational speed until after a certain delay time in which no exhaust gas energy, that is to say an insufficient exhaust gas pressure, is available to drive the exhaust gas turbocharger and therefore no compressed intake air with corresponding intake pressure is available. In order to get around this turbo lag, solutions have been proposed which are described in German Laid-Open Patent Applications DE 10 2006 008 783 A1 and DE 10 2006 008 785 A1. Here, compressed air, for example from a compressed air accumulator, is fed in a controlled fashion into the intake line of the internal combustion engine in order to cover the intake air demand of the internal combustion engine when said demand is increased. This is carried out by means of a component which is arranged in the intake line between the compressor of the turbocharger or an intermediate cooler connected downstream in the direction of flow and the intake manifold, and said component has a compressed air port with a flow rate control device and a controlled flap. When compressed air is fed in through the flow rate control device, the controlled flap is closed with the effect that the compressed air does not flow into the compressor of the exhaust gas turbocharger counter to the intake direction but rather flows directed into the intake line. When the compressed air supply ends, this flap is opened again. There is no description of controlling the intake pressure of an internal combustion engine, in particular at an excessively high compressor pressure of the exhaust gas turbocharger.

The object of the present invention is therefore to make available a method and a device for regulating an intake pressure of an internal combustion engine, wherein the above disadvantages are overcome or significantly reduced and further advantages are obtained.

A basic idea of the invention is that an actuating element is provided in an actuating section in the intake line between the compressor of the exhaust gas turbocharger or a downstream intermediate cooler and the intake manifold of the internal combustion engine in order to influence the cross section of the intake line as a function of the intake pressure of the internal combustion engine.

This advantageously ensures that this actuating element reduces the cross section of the actuating section of the intake line if the compressor of the exhaust gas turbocharger delivers a quantity of air which is too large for the current operating state at an excessively high pressure. The intake pressure downstream of the actuating element in the direction of flow can therefore be influenced by the position of said actuating element, in particular as a function of the intake pressure which is measured with a suitable measuring device.

A method according to the invention for regulating an intake pressure of an internal combustion engine, in particular diesel engine, having an exhaust gas turbocharger whose compressor is connected to an intake line of the internal combustion engine via an actuating section which has an actuating element for changing a cross section of the actuating section, has the following method steps:

acquisition of the current intake pressure in the intake line of the internal combustion engine and of a compressor pressure of the compressor by means of pressure sensors;

comparison of the acquired current intake pressure and of the compressor pressure with setpoint values which correspond to current operating data of the internal combustion engine by a control unit, and generation of an actuating signal with said control unit on the basis of the comparison; and changing of the cross section of the actuating section as a function of the current intake pressure, compressor pressure and the current operating data by adjusting the actuating element by the actuating signals generated by the control unit, in order to regulate the intake pressure of the internal combustion engine.

A further advantage is that either an exhaust gas turbocharger with a fixed geometry or an exhaust gas turbocharger with a variable geometry can be used, as a result of which the field of application of the invention is expanded.

In a preferred embodiment, the intake pressure is acquired by at least one pressure sensor downstream of the actuating element in the direction of flow. It is also preferred here that a compressor pressure is measured by a further pressure sensor which is arranged upstream of the actuating element in the direction of flow.

These pressure sensors can advantageously be arranged at a component, specifically the actuating section, which accommodates the actuating element. As a result, only a small amount of installation space is required.

The measured values which are acquired by the pressure sensors are received by the control unit and can be adapted to a specific format for further processing. They are compared with setpoint values which correspond to current operating parameters or operating data of the internal combustion engine. The current operating data are obtained by communicating with an engine control device of the internal combustion engine. The control unit can, for this purpose, also communicate directly with corresponding measuring means. The setpoint values which correspond to the current operating state of the internal combustion engine, for the respective intake pressure to be controlled, are acquired from the current operating data, for example on the basis of stored table values and/or computational algorithms, and are compared with the current measured values. The comparison yields a difference which is used to generate actuating signals. If the difference is equal to zero, no actuating signals are generated. The actuating signals are used to control an adjustment unit for the actuating element. These may be, for example, current, voltage, pulse sequence, etc.

In a further embodiment, the control unit is connected to measuring devices on the internal combustion engine which deliver data on, for example, pressure, mass flow rate, temperature, etc., which are significant not only for the control unit but also for the engine control device. The control unit can pass on these data to the engine control device to which it is connected, for example via a data bus. As a result, expenditure on cabling is saved, also allowing data to be transmitted more reliably.

By comparing the setpoint values which correspond to the current operating data with the current intake pressure values, the control unit adjusts the actuating element in order to reduce the cross section of the actuating section when the current intake pressure is too high. When the current intake pressure is too low, the actuating element is adjusted in order to increase the cross section of the actuating section. Simple regulation of the intake pressure of the internal combustion engine is therefore possible. An excessively high compressor pressure with an excessively high mass flow rate is easily reduced by making the cross section smaller through a corresponding, diminishing position of the actuating element which may be, for example, a flap.

In an alternative embodiment, when the current intake pressure is too low and the compressor pressure is too low, additional compressed air can be blown into the intake line, wherein the actuating element is adjusted under the control of the control unit in order to make the cross section of the actuating section smaller so as to prevent a backflow into the compressor. When the feeding in of compressed air ends, the actuating element is adjusted so as to make the cross section of the actuating section larger. For this purpose, the actuating section has, downstream of the actuating element in the direction of flow, an additional duct for the regulated, temporary feeding in of compressed air as a function of operating data of the internal combustion engine. Compressed air can also be fed in as a function of other operating data, for example in order to overcome the abovementioned turbo lag.

An inventive device for regulating an intake pressure of an internal combustion engine, in particular diesel engine, having an exhaust gas turbocharger, has the following:

an actuating section for connecting the intake line of the internal combustion engine to a compressor of the exhaust gas turbocharger;

an actuating element which is arranged in the actuating section and has an adjustment drive for changing a cross section of the actuating section;

a first pressure sensor for measuring a current compressor pressure of a compressor of the exhaust gas turbocharger;

a second pressure sensor for measuring the current intake pressure in the intake line of the internal combustion engine; and a control unit for comparing measured data of the pressure sensors with setpoint values which correspond to current operating data of the internal combustion engine, and for generating actuating signals in order to adjust the actuating element with the adjustment drive in order to regulate the intake pressure as a function of the measured data of the pressure sensors and current operating data of the internal combustion engine. For particularly advantageous regulation, it is expedient if the actuating element can be adjusted by an adjustment drive in an infinitely variable fashion with position feedback. However, the setting positions of the actuating element can, of course, also be embodied in an incremental fashion.

In an alternative embodiment, there is provision that the actuating section has an additional duct for letting in compressed air. As a result, a combined, advantageous device for regulating the intake pressure for adapting it to the operating states of the internal combustion engine is provided, and the actuating section is provided as a fresh air line section of a device for supplying fresh air for the controlled blowing in of compressed air.

Other objects, advantages and novel features of the present invention will become apparent from the following detailed description when considered in conjunction with the accompanying drawings.

BRIEF DESCRIPTION OF THE DRAWINGS

FIG. 2 shows a schematic sectional illustration of an exemplary embodiment of an actuating section of the device according to an embodiment of the invention.

DETAILED DESCRIPTION

Figure 1:
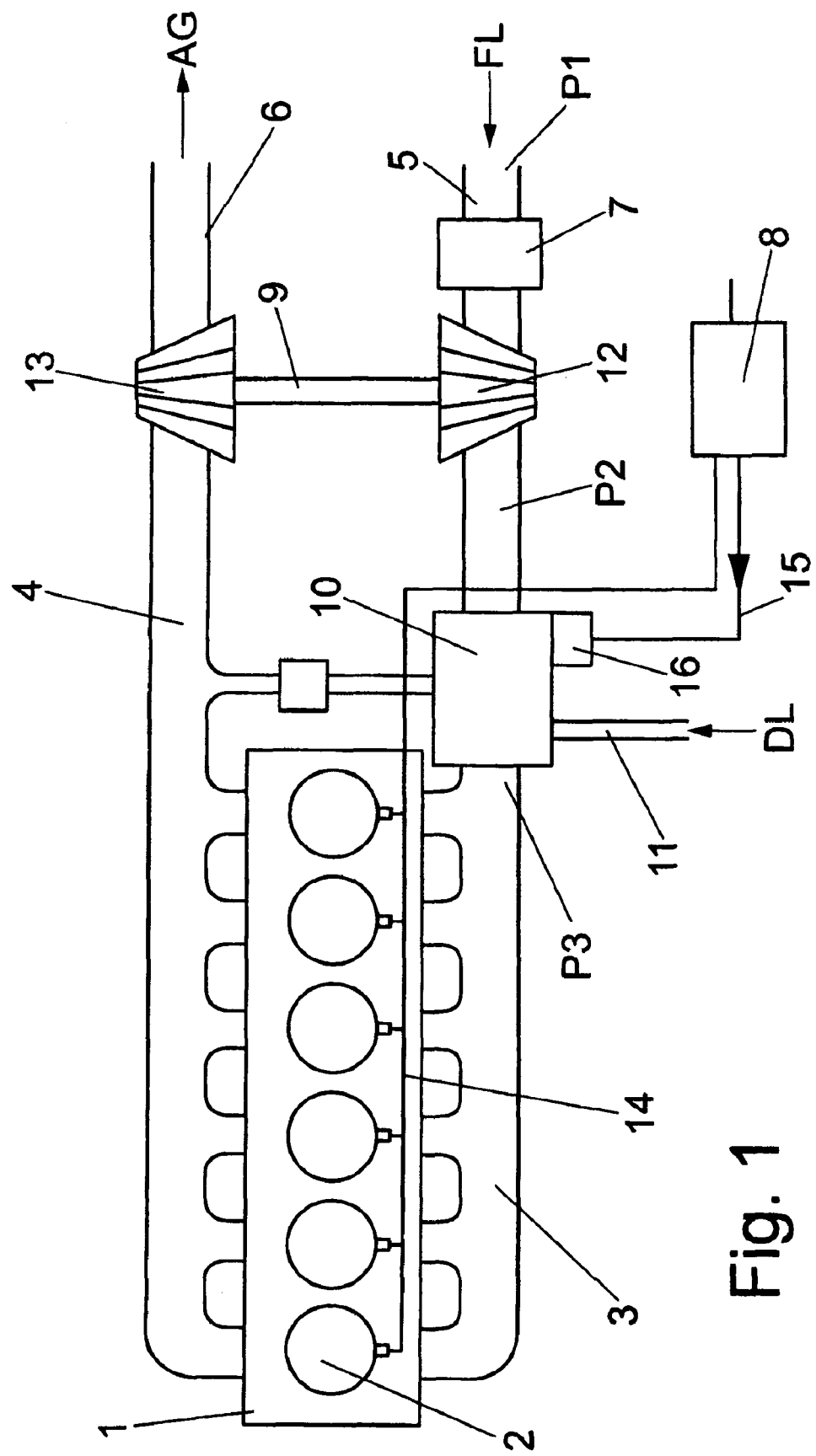
FIG. 1 shows a schematic illustration of an internal combustion engine with an exhaust gas turbocharger and a device according to an embodiment of the present invention for regulating an intake pressure of the internal combustion engine.

Identical components or functional units with the same function are characterized by the same reference symbols in the figures.

FIG. 1 shows a schematic illustration of an internal combustion engine 1 with an exhaust gas turbocharger 9 and a device according to the invention for regulating an intake pressure P3 in an intake line 3 of the internal combustion engine 1. The internal combustion engine 1 is, in this example, a diesel engine with six cylinders 2, the intake line 3 and an exhaust line 4. The intake line 3 is connected via an actuating section 10 to a compressor 12 of the exhaust gas turbocharger 9, which is connected via an air filter 7 to the air inlet 5 for fresh air FL at an inlet pressure P1. The compressor 12 of the exhaust gas turbocharger 9 is coupled to an exhaust gas turbine 13 which is arranged in the exhaust line 4 upstream of an exhaust gas outlet 6 for exhaust gas AG of the internal combustion engine 1 and is driven by the exhaust gas AG. The compressor 12 generates a compressor pressure P2 during operation of the internal combustion engine 1, as a function of the exhaust gas flow rate and exhaust gas pressure of said internal combustion engine 1.

In this example, the actuating section 10 is also connected to a compressed air line 11 for feeding in compressed air DL. The compressed air DL is, for example, stored in a compressed air vessel and/or is generated by a compressed air system (not shown). For example, the latter can be a compressed air-generating system or an additional system which is present in a utility vehicle.

An engine control device 8 is connected to injection systems of the cylinders 2. In this respect, only one control line 14 is indicated symbolically. A further connection 15 is connected to a control unit 16 of the actuating section 10. The engine control device 8 controls the internal combustion engine 1 in a known fashion and is not explained in more detail. It receives further measured data from the control unit 16 via the connection 15, and this is explained in more detail below.

The actuating section 10 is in this example a fresh gas line section or fresh air line section such as is described in DE 10 2006 008 783 A1 and DE 10 2006 008 785 A1 in conjunction with an associated compressed air-generating means. A more detailed explanation will therefore not be given here.

FIG. 2 is a schematic illustration of a longitudinal section through an exemplary embodiment of the actuating section 10 together with associated functional units.

The actuating section 10 is composed of a tubular body which is connected by its right-hand side to an inflow section 28 for a fresh air inflow 17 to the compressor 12 of the exhaust gas turbocharger 9 (see FIG. 1). Furthermore, an actuating element 20 in the form of a flap is arranged so as to be pivotable about a rotational axis 21 in the direction of flow (from right to left in FIG. 2). The actuating element 20 is coupled to an adjustment unit 22 and a position sensor 23. The through-cross section of the tubular body of the actuating section 10, and therefore the inflow 17, are embodied in a variable fashion with the actuating element 20. In this example, the adjustment unit 22 is embodied for infinitely variable adjustment of the actuating element 20.

In the left-hand region of the actuating section 10, an outflow section 29 is arranged which is connected to the intake line 3 for an outflow 18 (see FIG. 1) and in which the intake pressure P3 prevails. In this example, an additional duct 27 is arranged on the underside in the outflow section 29, which additional duct 27 communicates by one end with the outflow section 29. The other end of the supply section 27 is connected to a valve 30 which is embodied here as a solenoid valve and is embodied with its connection side for a compressed air inflow 19 of the compressed air line 11 (see FIG. 1).

The actuating section 10 also respectively has a measuring duct 26 upstream of the actuating element 20 in the direction of flow in the inflow section 28, and downstream of the actuating element 20 in the direction of flow in the outflow section 29. A measuring device 24, 25 is connected to each measuring duct 26, each of which measuring devices 24, 25 is a pressure sensor in this example.

The control unit 16 of the actuating section 10 is connected to the adjustment unit 22 and the position sensor 23 of the control element 20, the measuring devices 24, 25 and to the valves 30 and 37. Furthermore, it is connected to the engine control device 8 and has a port 31 for further connections, for example pressure sensors, temperature sensors, etc., of the exhaust gas line and/or of the exhaust gas turbocharger or at another location.

The function of this device will now be described.

If the intake pressure P3 decreases owing to a certain operating condition of the internal combustion engine 1, this operating condition is detected by sensors of the internal combustion engine 1, for example sensors for the rotational speed, pressure, temperature. These measured values are available in the engine control device 8 and on a bus if a bus system is present in the vehicle, and said measured values can be called by the control unit 16, for example via the connection 15 to the engine control device 8 and/or via the port 31. The control unit 16 then determines, on the basis of these current operating data, a setpoint value, corresponding to this current operating state, for the intake pressure P3 of the internal combustion engine 1.

The current value of the intake pressure P3 is acquired by the second pressure sensor 25 and transferred to the control unit 16. The associated current value of the compressor pressure P2 is acquired by the first pressure sensor 25 and also transferred to the control unit 16. The control unit 16 then compares the current value of the intake pressure P3 with the setpoint value acquired on the basis of the operating data. Said setpoint value can also be stored in table form in a memory device. Calculation by means of a suitable algorithm is also possible.

If the current value of the intake pressure P3 is considered to be too high after this comparison by the control unit 16, that is to say a difference between the current intake pressure P3 and the setpoint value is, for example, greater than zero, said control unit 16 generates an actuating signal and transfers it to the adjustment unit 22 for adjusting the actuating element 20, which makes the cross section of the inflow section 28 smaller as a function of the current excessively high intake pressure P3. As a result, although the compressor pressure P2 upstream of the actuating element 20 is increased, the air flow rate which is let through decreases, with the effect that the intake pressure P3 decreases until the difference between the current intake pressure P3 and the setpoint value becomes zero. The control unit 16 can therefore regulate an intake pressure P3 which is the optimum one for the respective operating state of the internal combustion engine 1. The position sensor 23, which transfers a current position of the actuating element 20 to the control unit 16, is also used for this purpose, and a let-through air flow rate of the inflow section 29 can be calculated or acquired from said current position, for example again by means of stored table values. As a result, the fuel consumption is reduced and the performance of the internal combustion engine 1 is improved.

If the intake pressure P3 is too low, the control unit 16 controls the actuating element 20 in such a way that the cross section of the inflow section 29 is made larger and the intake pressure P3 increases until the difference becomes zero again.

In the exemplary embodiment shown here with the connection of the compressed air line 11, if the compressor pressure P2, measured by the first pressure sensor 24, is too low, the valve 30 is opened and compressed air DL is blown as compressed air inflow 19 through the additional duct 27 into the actuating section 10 and therefore into the intake line 3 in order to increase the intake pressure P3. In this context, the control unit 16 simultaneously actuates the actuating element 20 in such a way that it prevents the compressed air inflow 19 from flowing back into the inflow section 29 by making the cross section of the inflow section 29 smaller or by closing it.

Through selective setting of the actuating element 20 and also of the valve 30, it is possible to regulate the intake pressure P3 by measured pressure values in the intake line 3 in such a way that the associated intake pressure P3 is regulated for the respective operating state of the internal combustion engine 1. The compressed air supply can also be used to overcome what is referred to as a turbo lag, for example when accelerating, in a way which is independent of the regulation of the intake pressure P3, as is stated above.

The invention is not restricted to the exemplary embodiments described above. It can be modified within the scope of the appended claims. For example:

The valve 30 can also be controlled pneumatically or electro-pneumatically.

The actuating section 10 can be a fresh gas line section of the compressed air device described in German Patent Publication Nos. DE 10 2006 008 783 A1 and DE 10 2006 008 785 A1 and can be coupled to it.

The control unit 16 can also be a component of the engine control device 8.

Furthermore, the control unit 16 can be connected to measuring devices of the internal combustion engine 1, which measuring devices supply measured values relating to the pressure, temperature, mass flow rate, etc. These values do not have to be relevant to the control unit 16. However, said control unit 16 can, for example, process or adapt said values and/or pass them on to the engine control device 8. In this context, for example, the associated installation work for cables is dispensed with, which cuts costs.

The actuating element 20 may be embodied, for example, as a flap or differently. For example, an actuating valve could be used, but in such a case its actuating time would have to be taken into account.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS

Internal combustion engine
Cylinder
Intake line
Exhaust line
Air inlet
Exhaust gas outlet
Air filter
Engine control device
Exhaust gas turbocharger
Actuating section
Compressed air line
Compressor
Exhaust gas turbine
Control line
Connection
Control unit
Fresh air inflow
Outflow
Compressed air inflow
Actuating element
Rotational axis
Adjustment unit
Position sensor
First pressure sensor
Second pressure sensor
Measuring duct
Additional duct
Inflow section
Outflow section
Valve
Port
AG Exhaust gas
DL Compressed air
FL Fresh air
P1 Inlet pressure
P2 Compressor pressure
P3 Intake pressure

What is claimed is:

1. A method for regulating an intake pressure of an internal combustion engine, having an exhaust gas turbocharger whose compressor is connected to an intake line of the internal combustion engine via an actuating section which has an actuating element for changing a cross section of the actuating section, comprising the acts of:

acquiring a current intake pressure in the intake line and a compressor pressure of the compressor;

comparing the acquired current intake pressure and the compressor pressure with setpoint values which correspond to current operating data of the internal combustion engine;

generating an actuating signal to control the actuating element to change the cross section of the actuating section based on the comparison;

feeding in compressed air into the actuating section downstream of the actuating element via an additional duct for the regulated, temporary feeding in of compressed air when the current intake pressure is lower than a redetermined minimum intake pressure and the compressor pressure is lower than a predetermined compressor pressure, wherein the changing of the cross section of the actuating section is made to make the cross section of the actuating section smaller to prevent compressed air from flowing back into the compressor, and when the feeding in of compressed air ends, the actuating element is adjusted to increase the cross section of the actuating section, wherein the intake pressure is acquired by at least one pressure sensor downstream of the actuating element, and the compressor pressure is acquired by a pressure sensor upstream of the actuating element.

2. The method according to claim 1, wherein a control unit acquires the current operating data of the internal combustion engine by communicating with at least one of an engine control device of the internal combustion engine and with corresponding operating data measuring device, wherein the setpoint values are at least one of calculated and obtained from stored table values.

3. The method according to claim 2, wherein the control unit communicates with at least one of sensors and measuring devices of the internal combustion engine and forwards operating data to the engine control device of the internal combustion engine in at least one of processed and unprocessed form.

4. The method according to claim 1, wherein when the current intake pressure is higher than a predetermined maximum intake pressure and the current compressor pressure is higher than a predetermined maximum compressor pressure, the actuating element is adjusted to reduce the cross section of the actuating section.

5. The method according to claim 2, wherein when the current intake pressure is too low below a predetermined minimum intake pressure, the actuating element is adjusted to increase the cross section of the actuating section.

6. A device for regulating an intake pressure of an internal combustion engine having an exhaust gas turbocharger, comprising:

an actuating section for connecting an intake line of the internal combustion engine to a compressor of the exhaust gas turbocharger;

an actuating element arranged in the actuating section, a position of the actuating element being adjustable by an adjustment drive for changing a cross section of the actuating section;

a first pressure sensor for measuring a current compressor pressure of a compressor of the exhaust gas turbocharger;

a second pressure sensor for measuring a current intake pressure in the intake line of the internal combustion engine; and a control unit, the control unit being programmed to compare measured data of the pressure sensors with setpoint values corresponding to current operating data of the internal combustion engine, and generate actuating signals to adjust the actuating element with the adjustment drive in order to regulate the intake pressure as a function of the measured data of the pressure sensors and current operating data of the internal combustion engine, wherein the first pressure sensor is arranged upstream of the actuating element and the second pressure sensor is arranged downstream of the actuating element, and the actuating section includes an additional duct downstream of the actuating element arranged to permit feeding of compressed air into the intake line.

7. The device according to claim 6, wherein the pressure sensors are arranged on the actuating section.

8. The device according to claim 6, wherein the actuating element is coupled to a position sensor which is connected to the control unit.

9. The device according to claim 6, wherein the control unit is connected to at least one of sensors and measuring devices of the internal combustion engine and is programmed to pass on at least one of processed and unprocessed form signals thereof to an engine control device of the internal combustion engine.

* * * * *